United States Patent [19]

Kishi et al.

[11] Patent Number: 4,703,441
[45] Date of Patent: Oct. 27, 1987

[54] COLOR DISPLAY METHOD FOR NC SYSTEM HAVING AUTOMATIC PROGRAMMING FUNCTION

[75] Inventors: Hajimu Kishi; Teruyuki Matsumura; Kunio Tanaka, all of Tokyo, Japan

[73] Assignee: Fanuc Ltd, Minamitsuru, Japan

[21] Appl. No.: 705,424

[22] PCT Filed: Jun. 5, 1984

[86] PCT No.: PCT/JP84/00285

§ 371 Date: Feb. 6, 1985

§ 102(e) Date: Feb. 6, 1985

[87] PCT Pub. No.: WO84/04979

PCT Pub. Date: Dec. 20, 1984

[30] Foreign Application Priority Data

Jun. 6, 1983 [JP] Japan .................... 58-100445

[51] Int. Cl.[4] ............................ G06F 15/72
[52] U.S. Cl. ................................ 364/526
[58] Field of Search ........................ 364/526

[56] References Cited

FOREIGN PATENT DOCUMENTS 37250 3/1980 Japan .
193807 11/1982 Japan .
82310 5/1983 Japan .

Primary Examiner—Michael L. Gellner
Attorney, Agent, or Firm—Staas & Halsey

[57] ABSTRACT

A color display method for a system having an automatic programming unit (101) equipped with a color display function, and an NC unit (102) which does not possess a color display function, wherein a correlation between a display item and a display color for an NC mode of operation is stored beforehand in a memory (105c) of a control unit (105). When a predetermined item display request key provided on an operator's panel (104) is pressed while in the NC mode, a control unit (105) informs the NC unit (102) of the name of the item for which display has been requested and applies color information, which corresponds to the item for which display has been requested, to a color display device (106). The NC unit applies item data, corresponding to the name of the item, to the color display device which displays the item data in a color designated by the color information applied thereto by the control unit (105).

7 Claims, 6 Drawing Figures

FIG. 6

```
PROGRAM 01 :           00001 N0007

00001 :
N0001 G00 X123.45 Z345.678 :
N0002 X0 Y0 Z0 :
N0003 G04 P3000 :
N0004 G00 X-123.45 Y-234.56
 Z-300.00 :
N0005 X0 Y0 Z0 :
N0006 G04 P3000 :
N0007 G00 X110.0 Y-122.30 :
N0008 Y-222.2 Z11.00 :
N0009 X200.0 Z200.0 :

LSK    INC
```

106t

COLOR DISPLAY METHOD FOR NC SYSTEM HAVING AUTOMATIC PROGRAMMING FUNCTION

BACKGROUND OF THE INVENTION

1. Technical Field

This invention relates to a color display method for a numerical control system equipped with a color display device. More particularly, the invention relates to a color display method whereby display items relating to numerical control are displayed in different colors on a color display device in a system including an automatic programming unit having color display software, an NC unit that does not have color display software, the color display device and an operator's panel.

2. Background Art

When constructing a new system, the system, with all the necessary functions, may be built up in integrated form as a single unit. However, lower cost, higher reliability, a lower amount of labor for development and facilitated maintenance are achieved by dividing all of the necessary functions and forming them into modules. Each module is designed independently and the modules are interconnected to form the desired system.

This modular method of system construction is applicable even when developing an NC system having both an automatic programming function and an NC function. Conventionally, however, rather than adopting the modular approach, a sophisticated automatic programming function is merely added to an NC unit, thus giving rise to problems related to processing speed and memory capacity. As a result, a separate processor which is not used for NC control, is added on, additional memory is provided, and the architecture itself must be redesigned. Moreover, in the prior art, an NC unit equipped with an automatic programming function must be specially designed for the particular machine tool (such as a lathe, milling machine, machining center or wire-cut electric discharge machine), or whenever there is a requirement for special specifications. This involves major problems in the areas of design and maintenance. Therefore, a desired system is assembled by forming an NC unit, which has an automatic programming function, into modules for (a) an automatic programming function, (b) an NC function, (c) a display function, (d) a data input/output function, and (e) a manual operation function. Design is carried out module by module, and the modules are appropriately combined to construct the system. As such a modular system, the assignee of the subject application has proposed a numerical control system equipped with an automatic programming unit for administering automatic programming, an NC unit for administering numerical control, an operator's panel and a display device provided for common use by both the automatic programming unit and NC unit, as well as a control unit. The control unit causes the operator's panel and the display device to operate on behalf of whichever unit corresponds to a selected mode, based on selection information for selecting an automatic programming mode or NC mode, which information is entered from a selection key provided on the operator's panel (see U.S. Ser. No. 536,879, filed Sept. 29, 1983.

The automatic programming unit in the foregoing system creates NC data on the basis of information entered by the operator in a conversational mode involving the display device. Predetermined inquiries and graphics are suitably displayed on the display device under the control of the automatic programming unit. Thus, in the automatic programming mode, a color display is desirable for the graphic display because of the need to make the automatic programming input operation easier and more reliable.

In the NC mode, on the other hand, when it is necessary to request a display of offset quantities, current position, program content, various parameters and the like, these need merely be displayed as simple characters on the display device and, hence, a color display is unnecessary.

Accordingly, the arrangement is such that the automatic programming unit possesses a color display function while the NC unit does not, and a color display can be provided only in the automatic programming mode.

Despite the color display capability, the fact that the color display is provided only in the automatic programming mode and not in the NC mode seems odd and is undesirable in terms of commodity image.

SUMMARY OF THE INVENTION

Accordingly, an object of the present invention is to provide a numerical control system in which a color display can be achieved not only in the automatic programming mode but in the NC mode as well.

Another object of the present invention is to provide a numerical control system in which various items relating to numerical control can be displayed in color in the NC mode in a simple manner even if the NC unit does not possess color display software.

The present invention provides a numerical control system equipped with an automatic programming unit for administering automatic programming, an NC unit for administering numerical control, and an operator's panel and a color display device provided for common use by both the automatic programming unit and NC unit. A control unit which causes the operator's panel and the color display device to operate on behalf of whichever unit corresponds to a selected mode, based on selection information for selecting an automatic programming mode or NC mode, which information is entered from a selection key provided on the operator's panel. A correlation between a display item and a display color in the NC mode is stored beforehand in a memory of the control unit, and when a predetermined item display request key (provided on the operator's panel) is pressed while in the NC mode, the control unit informs the NC unit of the display request information and applies color information, which corresponds to an item for which display has been requested, to the color display device, thereby causing the color display device to display the item in color.

BRIEF DESCRIPTION OF THE DRAWINGS

FIG. 6 is a diagram of an example of a display.

BEST MODE FOR CARRYING OUT THE INVENTION

Figure 1:
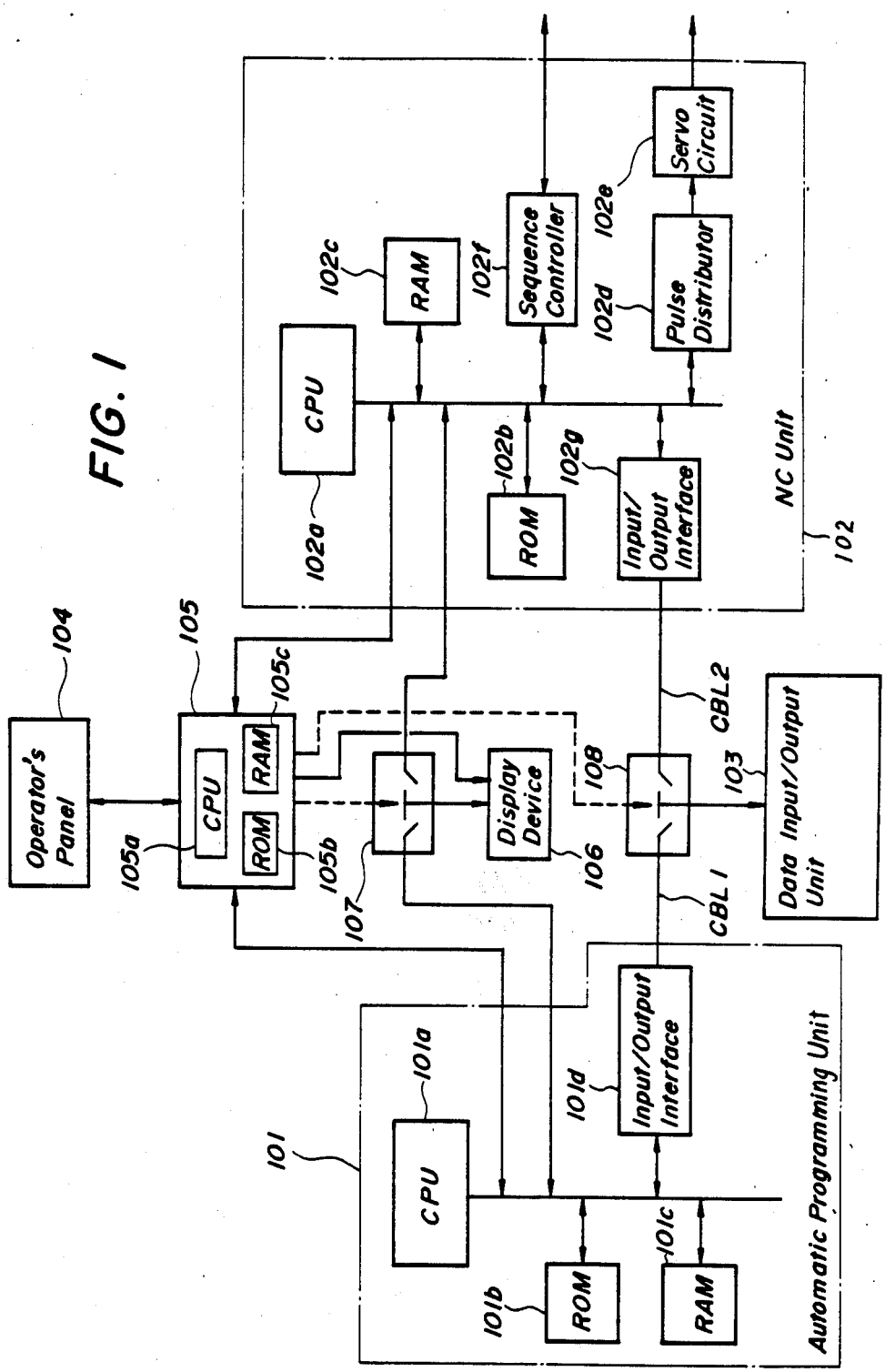
FIG. 1 is a block diagram of a numerical control system according to the present invention.
Figure 2:
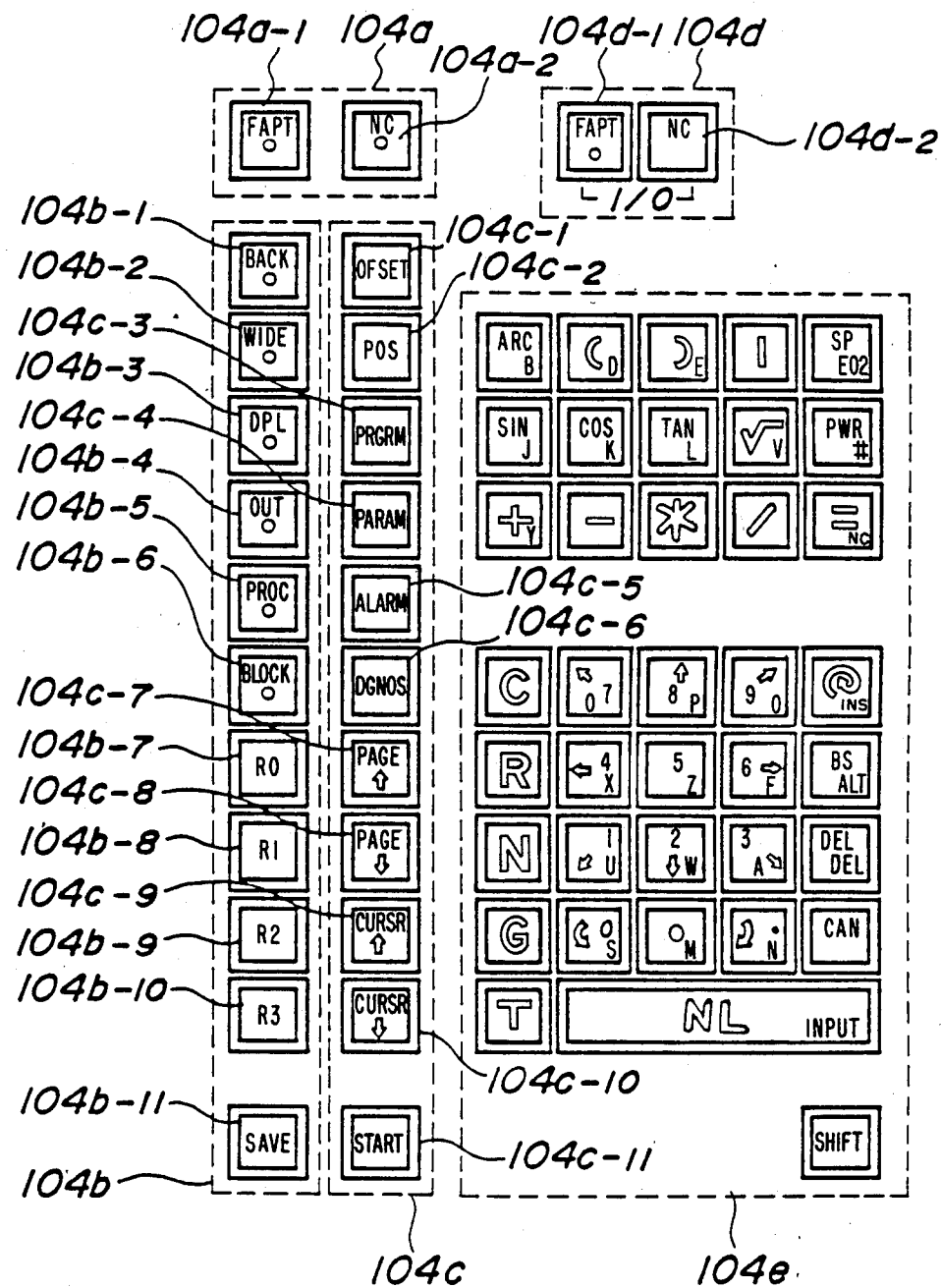
FIG. 2 is a diagram of the surface of the operator's panel 104 of FIG. 1.

FIG. 1 is a block diagram of an embodiment of the present invention. In the Figure, an automatic programming unit 101 has a microprocessor 101a which performs processing for NC machining data creation and the like, a read-only memory (ROM) 101b which stores a control program for the creation of NC machining data for the editing of display data, a random-access memory (RAM) 101c for storing a created machining program, and an input/output interface 101d which administers the exchange of data with an NC unit 102 and data input/output unit 103, described below. The NC unit 102 has a microprocessor 102a for executing numerical control based on the NC data and control program; a read-only memory (ROM) 102b for storing the control program; a data (RAM) memory 102c for storing the results of numerical control processing as well as NC data received from the automatic programming unit 101 and data input/output unit 103; a pulse distributor 102d for executing known pulse distribution computations based on a position command and feedrate applied as inputs thereto; a servo circuit 102e for driving and controlling the motors for various axes; a magnetics circuit or sequence controller 102f which, when M, S and T function instructions are read from the NC data, sends these instructions to the machine tool, and which sends to the processor 102a, e.g., signals received from the relay contacts and limit switches of the machine tool; and an input/output interface 102g. An operator's panel 104 has a multiplicity of keys, as illustrated in FIG. 2, and is used for both automatic programming and NC control. The keys may be classified generally as follows: (a) a one-of-two selection key group 104a for selecting whether the operator's panel 104 is to be used on behalf of the automatic programming unit 101 (referred to as the FAPT mode) or on behalf of the NC unit 102 (referred to as the NC mode), (b) a key group 104b used for the automatic programming unit 101, (c) a key group 104c used for the NC unit 102, (d) an I/O selection key group 104d for selectively connecting the data input/output unit 103 to the automatic programming unit 101 and NC unit 102, and (e) a common data input key group 104e used with both the automatic programming unit 101 and NC unit 102. The one-of-two selection key group 104a has a FAPT key 104a-1 and an NC key 104a-2, both of which are provided with lamps. Pressing the FAPT key 104a-1 establishes the FAPT mode so that the operator's panel 104 will operate on behalf of the automatic programming unit 101. In the FAPT mode, the key group 104c will be ineffective even if a key in the group is pressed, and the data input key group 104e for common use will work for the automatic programming unit. On the other hand, pressing the NC key 104a-2 establishes the NC mode, allowing the operator's panel 104 to work on behalf of the NC unit 102. Now the key group 104b will be ineffective even if these keys are pressed, and the data input key group 104e will operate in conjunction with the NC unit 102. The key group 104b for the automatic programming unit 101 includes state setting keys 104b-1 through 104b-6 for setting a variety of states in automatic programming, work designating keys 104b-7 through 104b-10, and a transfer key 104b-11 for transferring created NC data from the automatic programming unit 101 to the NC unit 102. The state setting keys include a BACK key 104b-1 for returning a cursor when a data input is made, and a WIDE key 104b-2 for expanding the display. Among the work designating keys, the RO key 104b-7 is for designating the start of automatic programming. The key group 104c for the NC unit 102 includes various item display request keys 104c-1 through 104c-6, keys 104c-7, 104c-8 for turning the page of the display screen, keys 104c-9, 104c-10 for moving a cursor, and a start key 104c-11 for starting NC operation. Among the display request keys, an OFSET key 104c-1 is used to display and set an offset quantity, a POS key 104d-2 is used to display present position, a PRGRM key 104c-3 is employed to display the contents of a program or the block currently being executed as well as the next block, a PARAM key 104c-4 finds use in displaying and setting parameters, and an ALARM key 104c-5 is used to display the contents of an alarm.

The I/O selection key group 104d, which is effective in both the FAPT and NC modes, includes a FAPT key 104d-1 for connecting the data input/output unit 103 to the automatic programming unit 101, and an NC key 104d-2 for connecting the data input/output unit 103 to the NC unit 102. The keys in the data input key group 104e for common use have meanings which differ depending upon whether the operating mode is the FAPT mode or NC mode, and depending upon the state established in that mode.

Figures 3, 4:
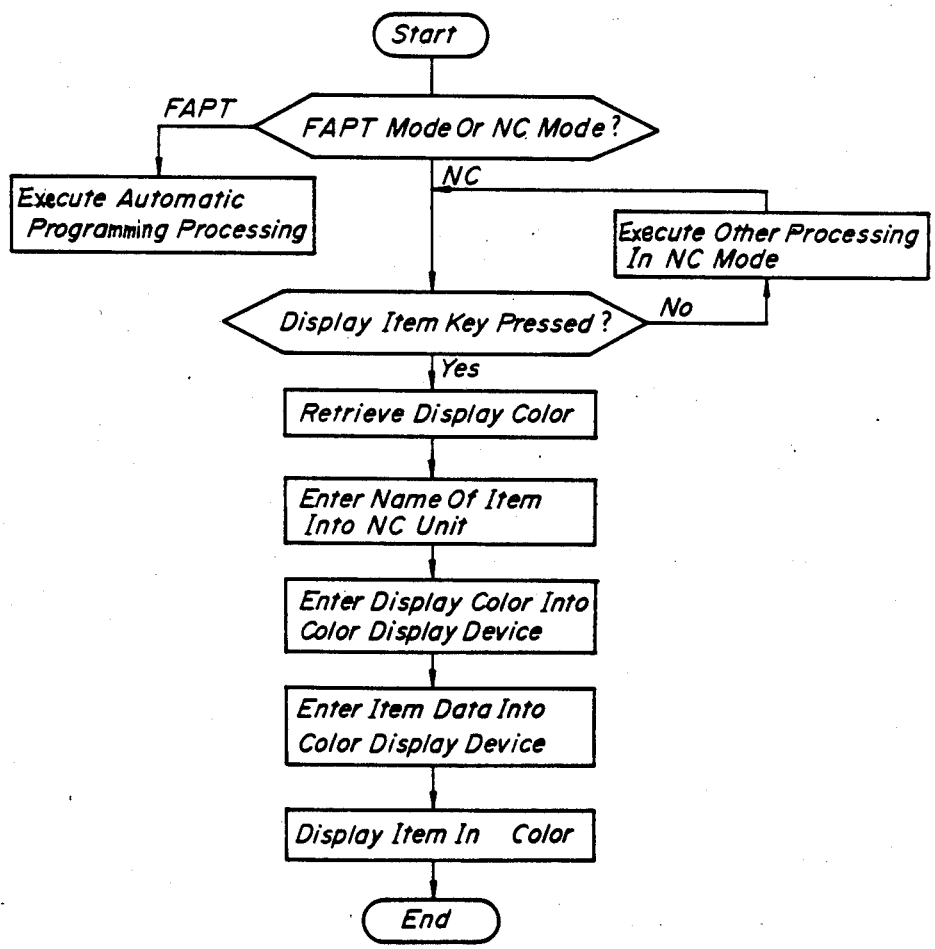
FIG. 3 is a a table showing the correspondence between display items and display colors.
FIG. 4 is a processing flowchart for color display according to the present invention.

Returning to FIG. 1, a control unit 105, which is constituted by a microcomputer, includes a processor 105a, a control program memory (ROM) 105b, and a data memory (RAM) 105c. Based on information produced as an output by the operator's panel 104, the control unit 105 (a) sends control information from the operator's panel 104 to the automatic programming unit 101 or NC unit 102, (b) connects the data input/output unit 103 to the automatic programming unit 101 or NC unit 102, (c) interconnects the automatic programming unit 101 and NC unit 102, (d) connects a display device 106 to the automatic programming unit 101 or NC unit 102, and (e) stores, in the data memory 105c, a correspondence table between various display items and display colors displayed on the color display device in the NC mode, informs the NC unit 102 of display request information when there is a request to display a predetermined item, and delivers color information, which corresponds to the item for which there has been a display request, to the color display device 106. More specifically, when the FAPT mode is selected (when the FAPT key 104a-1 is operated), the control unit 105 sends this information, which is produced by the operator's panel 104, to the automatic programming unit 101 and connects the display device 106 to the automatic programming unit 101 through a first switch 107. As a result, automatic programming becomes possible. On the other hand, when the NC mode is selected (the NC key 104a-2 is operated), the control unit 105 sends this information, which is produced by the operator's panel 104, to the NC unit 102 and connects the display device 106 to the NC unit 102 through the first switch 107. When the FAPT key 104d-1 in the I/O key group on the operator's panel 104 is pressed, the control unit 105 connects the data input/output unit 103 to the automatic programming unit 101 through a second switch 108. Pressing the NC key 104d-2 in the I/O key group connects the data input/output unit 103 to the NC unit 102 through the second switch 108. If the OFSET key 104c-1, POS key 104c-2, PRGRM key 104c-3, PARAM key 104c-4 or ALAM key 104c-5 is pressed when the NC mode has been selected, the control unit 105 sends the key information (information indicative of the name of the display item) to the NC unit 102, retrieves the color information corresponding to the pressed key (display item) from the display item-display color correspondence table stored in the data memory 105c, and sends the color information to the color display device 106 (see the flowchart of FIG. 4). By way of example, if an offset quantity and parameter are to be displayed in blue, current position and program in green and the content of an alarm in red, then the display item-display color correspondence table shown in FIG. 3 will have been stored in the data memory 105c. Then, when an alarm is generated in the NC mode and the operator presses the ALARM key 104c-5 to display the content of the alarm, the processor 105a sends the key information (alarm display request information) to the NC unit 102, obtains the display color (red) from the correspondence table in the data memory 105c, and applies the red information to the display device 106. When there is a request to display the alarm content, the NC unit 102 delivers data relating to the alarm to the color display device 106, this data coming from a variety of item data which have been prepared in the data memory 105c. As a result, the color display device 106 displays the content of the alarm on a cathode-ray tube in the color red through a well-known display technique.

The control unit 105 also performs a transfer operation. Specifically, when NC data are created in the FAPT mode and the data are ready to be transferred to the NC unit 102, the automatic programming unit 101 sends a signal, which indicates that the preparations for the transfer are complete, to the control unit 105, thereby rendering the transfer key 104b-11 effective. When the transfer key 104b-11 is pressed under these conditions, the control unit 105 sends a signal to the NC unit 102 to place the NC unit in an NC data reception state, and interconnects the automatic programming unit 101 and the NC unit 102 through the second switch 108. When the control unit 105 informs the automatic programming unit 101 of the fact that the NC unit 102 has been placed in the reception state, the automatic programming unit 101 goes to the RAM 101c, which stores previously created NC data, and transfers the data block by block to the data memory 102c of the NC unit 102 through the input/output interface 101d, cable CBL1, second switch 108, cable CBL2 and input/output interface 102g in the order mentioned. An EOR (end of block) code will have been inserted at the end of the NC machining data. Therefore, when the NC unit 102 senses the EOR code, it will recognize that all of the NC machining data have been received.

Figure 5:
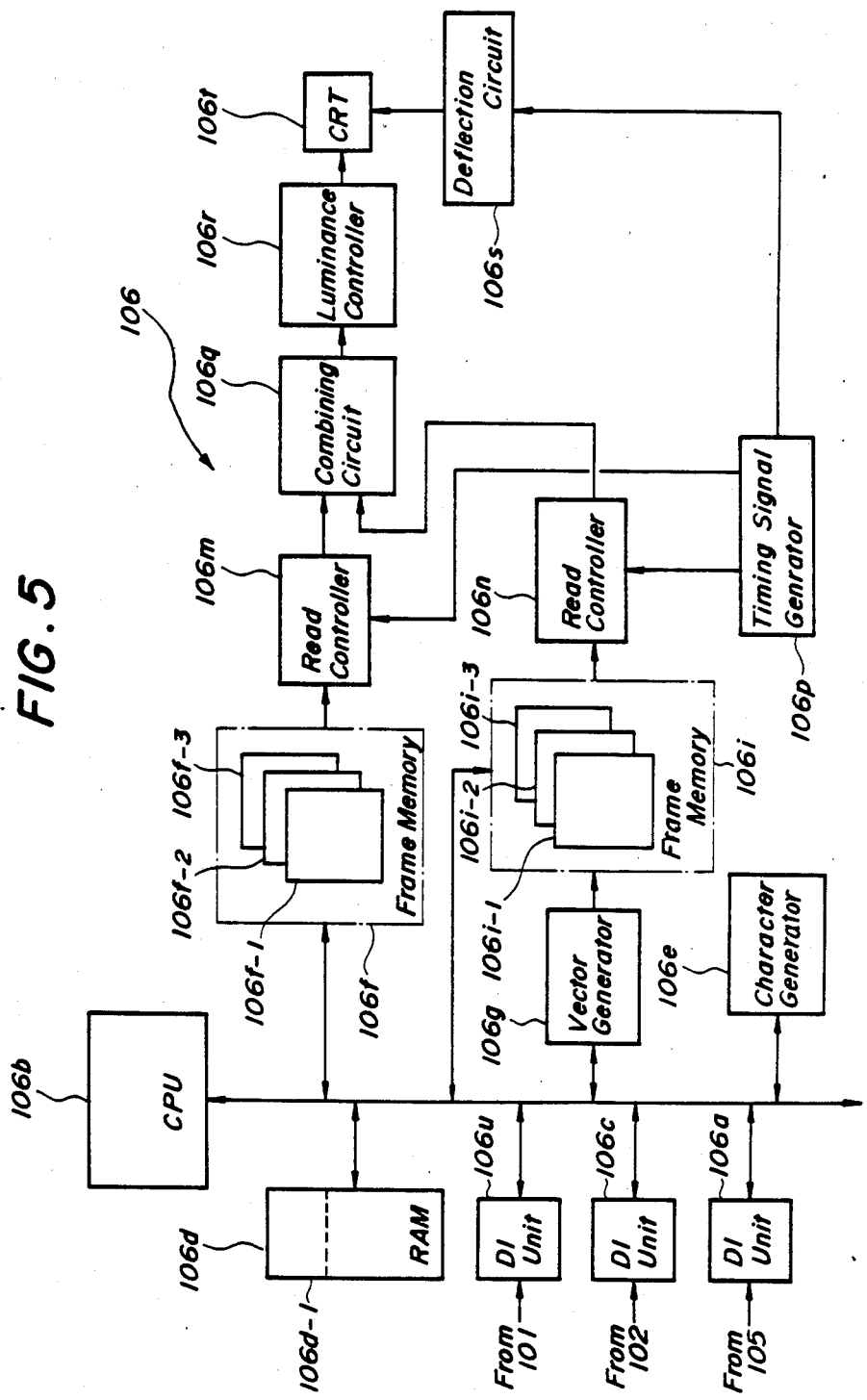
FIG. 5 is a block diagram of the color display device 106 of FIG. 1.

FIG. 5 is a block diagram of the color display device 106. As set forth above, the color display device 106 displays a picture of various display items sent by the NC unit 102a in addition to an automatic programming picture sent by the automatic programming unit 101.

More specifically, when the NC key 104a-2 on the operator's panel 104 (FIG. 1) is operated, the NC mode is established and NC mode information enters a data input unit (DI unit) 106a, shown in FIG. 5, from the control unit 105. A processor 106b reads the mode information from the DI unit 106a and recognizes that the information is indicative of the NC mode. When one key among the display request keys 104c-1 through 104c-6 provided on the operator's panel 104, is pressed in the NC mode, the processor 102a of the NC unit 102 (FIG. 1) learns from the control unit 105 which of the display request keys has been pressed, reads the item data corresponding to the display request key operated (one item of data from among offset data, current position data, content of NC data, content of various parameters, content of alarm and diagnostic data), and sends the data to a DI unit 106c. The processor 106b of the display device 106 accepts the item data via the DI unit 106c and stores the data in a first storage area 106d-1 of a RAM 106d.

Further, when the display request key is pressed, the control unit 105 sends color information corresponding to the pressed key to the DI unit 106a, and the processor 106b of the color display device 106 accepts the color information.

When the item data and color information enter the color display device 106 through the foregoing operations, the processor 106b applies color information to a frame memory 106f, reads character codes out of the first storage area 106d-1 in successive fashion, obtains a character image corresponding to the character codes by using a character generator 106e, and applies the character image to the frame memory 106f. The frame memory 106f is composed of three RAMs 106f-1, 106f-2, 106f-3 for red, blue and green, respectively. Color information is stored in the red RAM 106f-1 if red, in the blue RAM 106f-2 if blue, and in the green RAM 106f-3 if green. If the color information is indicative of yellow, the character image is stored in the red and green RAMs 106f-1, 106f-3, respectively. Likewise, if the color information is greenish blue, magenta or white, then the character image is stored in predetermined RAMs.

Accordingly, let us assume that the PRGRM key 104c-3 is pressed to request display of the NC program content. In such a case the character image indicative of the NC program is stored in the RAM 106f-3 for green. In synchronism with a timing signal generated by a timing signal 106p, a read controller 106m uses a raster scanning technique to read the images out of the respective RAMs 106f-1, 106f-2, 106f-3 constituting the frame memory 106f and applies the images read out of the RAMs to red, blue and green grid electrodes of a cathode-ray tube 106t via a luminance controller 106r. As a result, the NC program is displayed in the form of green characters on the cathode-ray tube 106t, as shown in FIG. 6. Further, in FIG. 5, numeral 106g denotes a vector generator, 106i a frame memory for graphics, 106n a read controller, 106q a combining circuit, 106s a deflection circuit, and 106u a DI unit. The frame memory 106i includes three RAMs 106i-1, 106i-2, 106-3 for red, blue and green, respectively, just as the frame memory 106f.

In the present invention as described in detail above, the arrangement is such that correspondence between a display item and a display color in an NC mode is stored beforehand, and when a predetermined item display request key provided on an operator's panel is pressed in the NC mode, a control unit informs an NC unit of the display request information and applies color information, which corresponds to an item for which display has been requested, to a color display device, thereby causing the color display device to display the item in color. This makes it possible to present various display items in color in a simple manner even if the NC unit does not possess color display software, thereby raising the commercial value of the NC system.

What is claimed is:
1. A color display method for an NC system having an automatic programming function and equipped with an automatic programming unit for administering automatic programming, an NC unit for administering numerical control, an operator's panel and a color display device provided for common use by both the automatic programming unit and NC unit, and a control unit which causes the operator's panel and the color display device to operate on behalf of the one of the NC unit and automatic programming unit which corresponds to a selected mode, based on selection information, entered from a selection key provided on the operator's panel, for selecting an automatic programming mode or an NC mode, comprising the steps of:

(a) storing beforehand a correlation between a display item and a display color in the NC mode;

(b) informing the NC unit, via the control unit, of the name of an item for which display has been requested when a predetermined item display request key provided on the operator's panel is pressed while in the NC mode; and (c) applying color information, which corresponds to the item for which display has been requested, to the color display device, so that the color display device displays the requested item in color.

2. A color display method for an NC system according to claim 1, wherein said step (a) comprises storing the correlation in a memory incorporated within the control unit.

3. A color display method for an NC system according to claim 1, wherein said step (c) comprises applying item data corresponding to the name of the item, from the NC unit to the color display device.

4. A color display method for an NC system according to claim 3, wherein said step (c) further comprises providing the color display device with frame memories for red, blue and green, storing an item image, based on the item data, in a predetermined one of the frame memories designated by the color information, and scanning the frame memory to display the item data in color.

5. A color display method for an NC system for performing an automatic programming function during an automatic programming mode and having an NC unit for performing a numerical control function during an NC mode, comprising the steps of:

(a) storing a predetermined correlation between items to be displayed and corresponding colors with which the items are to be displayed during the NC mode of operation;

(b) automatically informing the NC unit of the name of an item for which display has been requested when an operator selects an item for display;

(c) automatically supplying color information corresponding to the item for which display has been requested, to a color display device;

(d) providing item data corresponding to the item to be displayed, from the NC unit to the color display device; and (e) displaying the requested item in color on the color display device based on the color information supplied in said step (c) and the item data provided in said step (d).

6. A display system for use in an NC system including an NC unit for administering numerical control and an automatic programming unit for administering automatic programming, the display system being connected between the NC unit and the automatic programming unit and comprising:

an operator panel having a plurality of keys including a mode key for selecting modes including an NC mode and item display request keys for generating item display request signals;

a control unit coupled to said operator panel, said automatic programming unit and said NC unit, said control unit including:

means for storing a predetermined correlation between items to be displayed and corresponding display colors and for providing display color information as an output; and means for receiving one of the item display request signals from the operator panel when one of the item display request keys is actuated, for providing the name of the item corresponding to the item display request signal to the NC unit which in turn generates item data, and for causing said storing means to provide display color information corresponding to the item to be displayed; and a display device, coupled to the NC unit when the numerical control system is in the NC mode and coupled to said control unit, for receiving the item data corresponding to the item to be displayed from the NC unit and for receiving the display color information from said storing means, said display device displaying the item for which display has been requested in the color corresponding to the display color information.

7. A system as set forth in claim 6, wherein said display device includes:

a frame memory including a plurality of RAMs corresponding to the number of colors to be displayed, so that an item image is stored in the frame memory based on the item data and the corresponding display color information, said display device including means for scanning the frame memory to display the item data in color.

* * * * *